C. E. BEAN.
CULTIVATOR TOOTH CLAMP.
APPLICATION FILED NOV. 4, 1913.
1,113,293.
Patented Oct. 13, 1914.
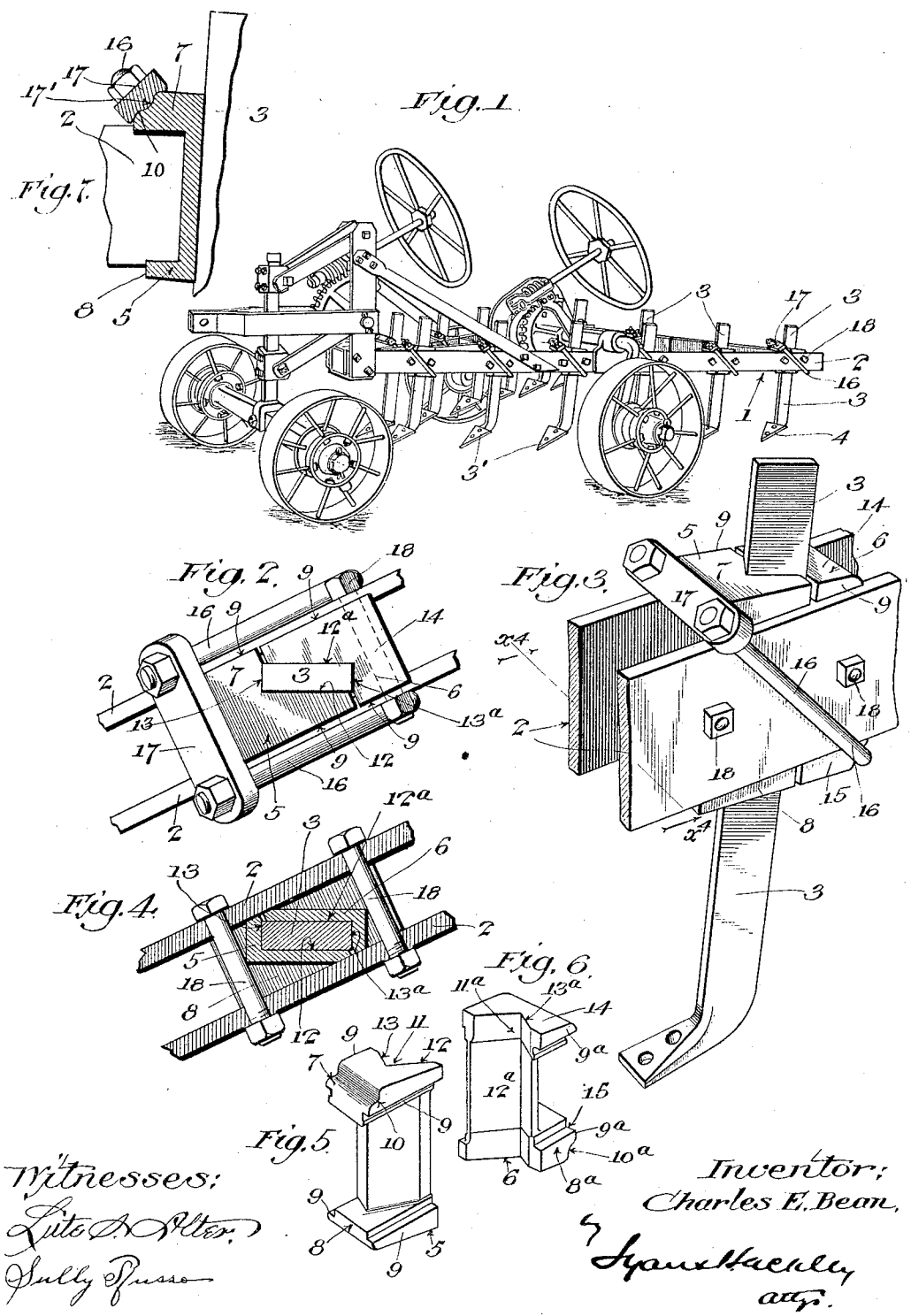
Witnesses:
Inventor:
Charles E. Bean, United States patent office.

CHARLES E. BEAN, OF LOS ANGELES, CALIFORNIA, ASSIGNOR TO KILLIFER MANUFACTURING COMPANY, OF LOS ANGELES, CALIFORNIA, A CORPORATION OF CALIFORNIA.

CULTIVATOR-TOOTH CLAMP.

1,113,293.

Specification of Letters Patent.

Patented Oct. 13, 1914.

Application filed November 4, 1913. Serial No. 799,128.

*To all whom it may concern:*

Be it known that I, CHARLES E. BEAN, a citizen of the United States, residing at Los Angeles, in the county of Los Angeles and State of California, have invented a new and useful Cultivator-Tooth Clamp, of which the following is a specification.

This invention relates to a clamp for attaching teeth to cultivators or the like, and one object of the invention is to provide for readily adjusting the elevation of the tooth.

Another object is to provide a clamp which will exert pressure against all four faces of the shank of the tooth and thereby firmly hold the tooth in position.

Referring to the drawings: Figure 1 is a perspective view of a cultivator provided with my improved clamp. Fig. 2 is a plan view of the clamp. Fig. 3 is a perspective view in detail of the clamp and tooth. Fig. 4 is a horizontal section on line $x^4$—$x^4$, Fig. 3. Fig. 5 is a perspective view of one of the clamp members. Fig. 6 is a perspective view of the other clamp member. Fig. 7 is a transverse section through one of the lower heads.

The frame of the cultivator comprises a pair of rearwardly diverging frame members 1, each frame member 1 comprising two bars 2 which are arranged parallel with each other.

3 designates the shank of the cultivator tooth and 3' designates the blade which, as herein shown, is made separate from the shank 3. The shank 3 is rectangular in cross section, as shown in Figs. 2 and 4, and is clamped between two clamp members 5 and 6, shown in detail respectively in Figs. 5 and 6. The clamp member 5 comprises upper and lower heads 7 and 8, each head having laterally projecting flanges 9, which project over and fit against the edges of the bars 2. The upper head 7 is wedge shaped and at its thicker end is provided with a transverse groove 10. The lower head is also wedge shaped. The clamp member 5 is formed with a vertical recess 11 with a wide face 12 and a narrower face 13, these two faces being at right angles to each other, and the two faces also being at an angle to the two bars 2, as clearly shown in Figs. 2 and 4. Clamp member 6 is very similar in construction, except that its lower head $8^a$ has a groove $10^a$ and its upper and lower heads 14 and 15 respectively are provided with flanges $9^a$, similar to the flanges 9. The clamp member 6 also has a recess $11^a$ with faces $12^a$ $13^a$. The shoulders formed by the flanges 9 and $9^a$ are at a slight angle to the recesses 11 and $11^a$, so that when the shank 3 of the tooth is gripped between the clamp members, it causes the shank to stand at a slight angle, as shown in Figs. 1 and 3, with the lower end of the tooth projected slightly forward.

The two clamp members 5 and 6 are clamped together by means extending diagonally across the members from groove 10 to groove $10^a$, such means, as herein shown, comprising a shackle bolt 16, the bow of which engages the groove $10^a$, and the cross bar 17 which engages the groove 10, while the side members of the shackle bolt extend up outside of the respective frame bars 2, so that when the shackle bolt is drawn tight, it firmly forces the clamp members against the tooth in opposing directions and causes a clamping pressure to be exerted against all four faces of the shank of the tooth. The flanges on the clamping members serve to hold the clamping members in perfect position against rocking on the bars 2, and the tooth is positively held in the position desired. Bolts 18 extend through the frame bars 2, on opposite sides of the clamping members, as clearly shown in Figs. 1 and 4. These bolts positively prevent movement of the clamps in a direction longitudinally of the frame bars 2.

What I claim is:

1. In combination with the parallel frame bars, a pair of clamping members between said bars, each clamping member having a recess with two faces at an angle to each other, the two faces of each clamping member being also at an angle to the said frame bars, a tooth shank lying within the recesses between said clamping members, and means extending diagonally across the clamping members, outside of the frame bars and engaging diagonally opposite corners of the said clamping members for holding the said clamping members together.

2. In combination with the parallel frame bars, a pair of clamping members between said bars, each clamping member having a recess with two faces at an angle to each other, the two faces of each clamping member being also at an angle to the said frame bars, a tooth shank lying within the recesses between said clamping members, and means extending diagonally across the clamping members, outside of the frame bars and engaging diagonally opposite corners of the said clamping members for holding the said clamping members together, each of said clamping members having laterally extending flanges on their upper and lower ends which project over the said frame bars.

3. In combination with the parallel frame bars, two clamping members between said bars, each of said clamping members having a recess with two faces at right angles to each other, both of said faces being at angles to the frame bars, a tooth shank between the said members and engaged in the said recesses, one of said members having a transverse groove in the outer corner thereof, and the other member having a transverse groove in the corner thereof, diagonally opposite the groove of the other member, and a shackle bolt extending diagonally across between the two members outside the frame bars, and engaging in the said two grooves.

4. In combination with the parallel frame bars, a pair of clamping members between said bars, each clamping member having a recess with two faces at an angle to each other, the two faces of each clamping member being also at an angle to the said frame bars, a tooth shank lying within the recesses between said clamping members, means extending diagonally across the clamping members, outside of the frame bars and engaging diagonally opposite corners of the said clamping members for holding the said clamping members together, and a pair of bolts extending through the said frame bars on opposite sides of the said clamping members.

In testimony whereof, I have hereunto set my hand at Los Angeles, California, this 12th day of August, 1913.

CHARLES E. BEAN.

In presence of—
GEORGE T. HACKLEY,
LORRAINE E. DURROW.

---

Copies of this patent may be obtained for five cents each, by addressing the "Commissioner of Patents, Washington, D. C."